Oct. 17, 1967 R. J. ZIELINSKI ETAL 3,348,104

BIAS-CONTROLLED A.C.-OPERABLE VOLTAGE THRESHOLD CIRCUIT, AND SYSTEMS EMPLOYING SAME

Filed Dec. 14, 1964

2 Sheets-Sheet 1

INVENTORS:
FREDERICK W. WESTBERG
ROBERT J. ZIELINSKI
BY Howson & Howson
ATTYS.

BIAS-CONTROLLED A.C.-OPERABLE VOLTAGE THRESHOLD CIRCUIT, AND SYSTEMS EMPLOYING SAME

Filed Dec. 14, 1964 2 Sheets-Sheet 2

INVENTORS:
FREDERICK W. WESTBERG
ROBERT J. ZIELINSKI
BY Howson & Howson
ATTYS.

3,348,104

BIAS-CONTROLLED A.C.-OPERABLE VOLTAGE THRESHOLD CIRCUIT, AND SYSTEMS EMPLOYING SAME

Robert J. Zielinski, Mayfield Heights, and Frederick W. Westberg, North Olmsted, Ohio, assignors to American Gas Association, Incorporated, New York, N.Y., a corporation of New York Filed Dec. 14, 1964, Ser. No. 417,960
23 Claims. (Cl. 317—130)

This invention relates to electrical circuits employing a voltage threshold device which is operated or not operated by an alternating voltage applied thereto depending upon the value of electrical bias also supplied to said device. More particularly, it relates to such circuits which are responsive to changes in electrical resistance values or to changes in rectification characteristics of an element to produce indications of such changes; examples of such circuits are resistance-sensing circuits, rectification-sensing circuits, flame-sensing circuits, light-responsive circuits, etc. The invention also relates to combinations of such circuits in systems for control or indicating purposes, especially for flame-control or flame-indicating purposes.

Various electrical circuits are known in the prior art in which a voltage threshold device, such as a vacuum tube triode, is supplied with an alternating voltage effective to actuate said device between its high conduction state and its low conduction state only when a bias voltage applied to said device is in a predetermined range of values. It is also known to cause such bias voltage to vary in response to a characteristic to be sensed, such as the resistance or rectification characteristic of an element for example, so that when said characteristic has a preselected value the corresponding bias voltage will permit said device to be actuated by said alternating voltage.

One specific application of such circuits has been in the field of flame sensing, wherein it is desired to produce actuation of a voltage threshold device only when a flame is present between a pair of electrodes. The flame has the characteristic not only of reducing the resistance between the electrodes, but also exhibits an asymmetrical conduction characteristic whereby its resistance is greater for one direction of applied voltage than for the other.

However, such flame-sensing circuits of the prior art have typically been relatively complex and costly and/or capable of responding to failure of various of the components thereof to produce spurious indications of the presence of a flame when in fact none is present. The latter type of spurious indication is highly undesirable, particularly where the circuit is intended to control the cutting off of fuel supply to a burner when the flame is absent; instead it is important to provide a high degree of "fail-safe" operation such that the failure of any of a variety of components or connections in the circuit will produce an indication that the flame is absent, rather than present.

This invention is applicable to use in flame-sensing circuits, and highly advantageous for this purpose. However it has been found that the invention is of much broader applicability and is useful in a large variety of different applications. For example it may be used in detecting the presence and/or quality of rectifying characteristics generally, in sensing the values of slowly-varying or rapidly-varying resistances, as well as in more specialized applications such as amplifiers, amplifier driver circuits, time delay circuits, light-responsive amplifiers and others.

Accordingly the objects of the invention include the following:

To provide a new and useful bias-controlled A.C.-operable voltage threshold circuit;

To provide such a circuit which is simple in form and reliable in operation;

To provide such a circuit which has "fail-safe" characteristics in that failure of various of the elements thereof will be unable to produce spurious operation of said threshold device;

To provide such a circuit which is operable with relatively low supply voltages;

To provide a new and useful flame-sensing circuit;

To provide a novel flame-sensing circuit which is simple and inexpensive and will not produce false indications of a flame upon failure of any of a variety of components of the sensing circuit;

To provide a new and useful flame-sensing circuit which is operable despite substantial variations in the condition of the flame and of the flame-sensing electrodes therein, as well as in the values of the circuit elements contained therein;

To provide a new and useful flame-sensing circuit which is relatively insensitive to variations in capacitance effects due to the flame and to the leads and electrodes extending to the flame;

To provide a new and useful flame-sensing circuit which responds rapidly to the presence or absence of a flame, promptly to produce indications thereof;

To provide such a flame-sensing circuit which operates with low supply voltages;

To provide a flame-sensing circuit the output signal of which is in optical form;

To provide a new and useful circuit for sensing the quality of rectification of an asymmetrically-conductive device;

To provide a new and useful method for measuring the value of a resistance;

To provide a new and useful circuit for sensing the resistance of an element;

To provide such a resistance-sensing circuit which is especially adapted reliably to sense high values in resistance;

To provide such a resistance-sensing circuit which provides a predetermined type of output indication in the event of a failure in any of a number of components of the circuit;

To provide such a resistance-sensor which produces an optical output signal;

To provide a new and useful signal transfer circuit;

To provide such a signal transfer circuit which is responsive to input signals in optical form;

To provide such a signal transfer circuit which produces an optical output signal;

To provide such a signal transfer circuit which is responsive to an optical input signal to provide signal amplification;

To provide such a signal transfer circuit which is responsive to input signals of relatively lower frequency to produce output signals of relatively higher frequency;

To provide a new and useful signal transfer circuit not requiring transistors or vacuum tubes;

To provide such a signal transfer circuit which produces a predetermined type of output signal in the event of failure of any of a variety of components of the circuit;

To provide a new and useful time-delay circuit for producing output signals throughout a predetermined time-delay interval following closing of a switch and for terminating said signals at the end of said time-delay interval;

To provide such a time-delay circuit which produces an optical output signal;

To provide new and useful combinations of a plurality of the above-described particular forms of the invention; and To provide new and useful burner control apparatus for terminating supply of fuel to a burner when a flame is absent from the burner.

These and other objects of the invention are achieved by the provision of novel apparatus now to be generally described.

A source of alternating voltage input is connected by way of capacitive means to a voltage threshold device, which is preferably a voltage breakdown device such as a simple two-electrode gas discharge tube or glow lamp.

As utilized herein the term "voltage threshold device" designates a device which is responsive to input voltages of greater than a predetermined threshold value but substantially non-responsive to voltages of less than said predetermined value; the term "voltage breakdown device" designates a type of voltage threshold device which changes from a low-conduction state to a high-conduction state, or "fires," when the voltage applied thereto rises above a predetermined "firing" voltage level and changes back to its low-conduction state when the voltage applied thereto decreases to an extinction voltage level less than said firing voltage level.

The zero-to-peak value of the alternating voltage so applied to the voltage threshold device is less than that required to actuate the voltage threshold device, e.g. is less than the firing voltage $V_f$ of the glow lamp. Means are provided in parallel with said voltage threshold device for producing a first value of electrical resistance to currents flowing between said source and said capacitive means during the occurrence of a first polarity of said alternating voltage, and a second and different value of electrical resistance to such currents during the occurrence of the opposite polarity of said alternating voltage. As a result, a net charge remains on said capacitive means after one or more half-cycles of alternation of said alternating voltage input, producing a D.C. voltage component, or bias voltage, across said threshold device in addition to the above-mentioned alternating voltage applied thereto from said source. This D.C. voltage component, produced during one polarity of half-cycles of said alternating voltage, is of the same sign as the opposite polarity of half-cycles of the alternating voltage and hence combines additively therewith.

The firing voltage $V_f$ of the threshold device is made such that while it will not fire in response to the alternating voltage component alone, it will fire in response to the sum of the above-described D.C. voltage component and a half-cycle of the alternating voltage component of the same sign as said D.C. voltage component. That is, the threshold voltage $V_f$ is made greater than the zero-to-peak value of the A.C. component applied across the threshold device for either polarity of the alternating voltage, but less than the sum of the D.C. component of voltage generated and applied across the threshold device plus the zero-to-peak value of that portion of the alternating voltage applied across the voltage breakdown device which is of the same polarity as the D.C. voltage component.

In a preferred form of the invention, the alternating voltage input is symmetrical about a zero-voltage axis, being for example in the form of a sine wave; substantially the entire amplitude of the alternating voltage input is applied across the voltage threshold device; and substantially all of the D.C. voltage component is also supplied across the voltage threshold device, which is preferably a glow lamp. In this case the firing voltage $V_f$ is between once and twice the zero-to-peak value of the alternating voltage, since the maximum D.C. voltage component is substantially equal to the zero-to-peak voltage of the alternating voltage input.

Actuation of the voltage threshold device in the manner described above results in at least some discharging of the capacitive means. During the next one or more cycles of input alternating voltage the capacitive means is recharged in the same manner described above until the voltage threshold device is again actuated, and this action continues to repeat itself so long as a substantial difference remains between the resistances to currents flowing between the voltage source and the capacitive means for opposite half-cycles of the input alternating voltage. Each successive firing of the gaseous discharge device is indicated by an optical glow emanating therefrom, and by a pulse of electrical current passing through it. Depending on the exact form of circuit used and the values of the components thereof, actuation of the voltage threshold device may be produced at the frequency of the input alternating voltage or at a sub-multiple thereof.

It will be appreciated that the above-described actuation or firing of the voltage threshold device can occur only when the resistance presented to current flowing between the alternating voltage source and the capacitive means is different for the opposite polarities of the alternating voltage, so that a net charge can accumulate on the capacitive means. If instead this resistance is the same for both polarities of the alternating voltage, no net charge can accumulate on the capacitive means and the voltage across the voltage threshold device can never arise above the zero-to-peak value of the alternating voltage and hence firing cannot occur. The "fail-safe" properties of the circuit are therefore excellent, since, in the absence of such a difference in resistances for opposite polarities of the alternating voltage, there cannot exist in the circuit any voltage of sufficient magnitude to exceed the firing level of the voltage breakdown device, even if open-circuits, short-circuits, or changes in values of the circuit components occur. Furthermore, the circuit acts quickly, requires only a relatively low supply voltage since the supply voltage is less than the firing voltage of the voltage breakdown device, and is capable of producing an optical output from the voltage breakdown device which can be coupled to other photosensitive elements.

In one preferred form of the invention the difference in electrical resistance for opposite polarities of the alternating voltage is provided by a flame extending between electrodes connected in parallel with the voltage-breakdown device and exhibiting rectifying properties. When the flame is present its rectifying properties cause the voltage threshold device to be actuated, and when the flame is absent the voltage threshold device cannot be actuated even by failure of the components of the circuit. Since this form of the circuit may comprise merely a source of alternating voltage connected across the series combination of a capacitor and a pair of flame electrodes, together with a glow lamp in parallel with the flame electrodes, a particularly simple, inexpensive yet reliable flame-detection circuit is thereby provided. In the latter example the indication of the presence of a flame comprises repetitive glowing of the glow lamp, which may be observed visually or coupled to other photosensitive elements for further processing as an indicating signal. Alternatively, the electrical current occurring through the voltage breakdown device when it fires may be used to control a further actuating or indicating circuit. Whether the optical or electrical output signals of the voltage breakdown device are utilized, they may be applied to hold open a normally-closed fuel-supplying device which supplies fuel to the flame, so that when the flame disappears the disappearance of the corresponding output signals will permit the control element to return to its normally-closed state for which fuel is prevented from reaching the burning area.

By placing in parallel with the flame a resistor and a diode rectifier poled oppositely to the effective rectifier provided by the flame, the current flowing to the capacitive means when the flame is biased in its low-conduction direction can be controlled by selection of the value of the resistor. This property of the circuit is taken advantage of in certain embodiments of the invention by making the above-mentioned parallel resistor controllably variable, so that, by varying the value of the resistor and noting its value when the voltage breakdown device just fails to be actuated even though the flame is present, an indication of the rectification efficiency of the flame, or of any other at-least-partially rectifying device positioned in place of the flame, can be determined.

In another form of the invention the flame is replaced by an actual diode rectifier and resistance in series with each other. The latter resistor is preferably a condition-sensitive resistor element such as a humidity-sensitive resistor, a temperature-sensitive resistor or a photo-sensitive resistor. An indication of the value of the condition-sensitive resistor at a given time may be obtained by placing a known value of resistance in parallel with the voltage threshold device and detecting the time at which the voltage threshold device is first actuated. Alternatively, the parallel resistor may be made controllably variable and a second diode rectifier, poled oppositely to the first above-mentioned diode rectifier, disposed in series with the variable resistor and the capacitive element. By observing the value of the variable resistor for which the voltage threshold device first is actuated, an indication of the contemporaneous value of the condition-sensitive resistor is obtained.

In another embodiment of the invention a signal transfer circuit capable of providing amplification and other features of operation is provided by varying the difference in resistance to current flowing to the capacitive means from the alternating voltage source during opposite polarities of the alternating voltage input in accordance with an input signal. Preferably this is accomplished by utilizing a photoconductive element in series with the capacitive means and illuminating it with a varying optical signal. In one embodiment the photoconductive element may have a response time either long or short compared with the period of the alternating voltage, in which case a diode rectifier is included in series with the photosensitive resistor and the capacitive means. Variations in the strength of the optical signal applied to the photosensitive resistor cause the resistance of the latter element to vary between values for which the voltage threshold device is actuated and values for which it is not actuated. For example, the photoconductive element may be illuminated by light from the glow lamp of a flame-sensing circuit constructed in accordance with the invention as described above, so as to actuate the voltage threshold device when the flame-sensor glow lamp is fired and not at other times. Alternatively, the diode in series with the photoconductive element may be omitted and the optical input signal caused to increase during one particular polarity of half-cycles of the alternating input voltage, so that the resistance of the photoconductive element is different for opposite-polarity half-cycles of the input alternating voltage; this again will cause the above-described accumulation of charge on the capacitive means and actuation of the voltage breakdown device. Such a circuit may be utilized, for example, as a driver circuit supplied with optical signals from a preceding flame-sensing circuit and supplying its output signals to an output circuit for actuating a fuel-control valve supplying fuel to a burner.

In another embodiment of the invention there is provided a circuit which provides firing of a voltage breakdown device only for a limited, predetermined time-delay interval following the closing of a switch. In the latter circuit there are again employed a source of actuating voltage, capactive means, rectifying means and a voltage breakdown device, but in this case switch means are also employed for alternatively connecting said rectifying means or said voltage breakdown device in series with said source and said capacitive means. When the rectifying means is so-connected the capacitor is charged; when the voltage breakdown device is then connected into the circuit by operation of the switch means, the direct-voltage component due to charging of the capacitor and an alternating-voltage component are both applied across the voltage breakdown device and are sufficient to fire the breakdown device intermittently during initial cycles of the alternating voltage. However, after a predetermined interval of time the charge removed from the capacitive means by successive pulses of conduction through the voltage breakdown device reduces the direct-voltage component to a level for which the breakdown device no longer fires in response to the alternating-voltage component. Accordingly the breakdown device is operated intermittently throughout a predetermined time interval beginning with the operation of the switch means, and then ceases to be operated. To facilitate this action the capacitive means preferably comprises a relatively-smaller valued capacitor connected between the source of alternating voltage and the voltage breakdown device, a relatively-larger valued capacitor connected between the rectifying means and the source of alternating voltage, and a resistor connecting the two capacitors in parallel with each other. With the latter arrangement, the smaller capacitor is substantially discharged by each pulse of current through the breakdown device but is recharged from the larger-valued capacitor in the times between successive pulses until the charge on the larger capacitor also falls below the level required to permit firing of the breakdown device.

In an especially advantageous form of the invention the last-described time delay circuit is combined with a pair of flame-sensing electrodes connected in parallel with the voltage breakdown device so that if a flame is present between the electrodes the voltage breakdown device will continue to be operated intermittently by the rectifying action of the flame even after the delay interval is over. Conduction through the breakdown device may be used to actuate a semiconductor controlled-rectifier which in turn controls a relay to maintain a supply of gas for the flame even after the delay interval is over.

In another form of the invention the above-described general type of time-delay circuit uses a glow lamp for the voltage breakdown device so that during the delay time the lamp glows in synchronism with the alternating voltage. The glow from the lamp is applied optically to the photo-sensitive element of a signal transfer circuit of the type described herein, and a separate flame-sensing circuit of the type also described herein provides an optical output to the same photo-sensitive element when flame is present. By operating the switch in the time-delay circuit when an igniter for a fuel burner is to be actuated, the signal transfer circuit is thereby actuated by the output of the time-delay circuit to turn on the supply of fuel to the burner, even though a flame is not present at the burner, for a predetermined limited interval of time during which ignition is intended to occur, after which, if ignition has not occurred, the time-delay circuit returns to its unactuated condition and permits the fuel supply to be cut off again. However, if ignition occurs during the time-delay period, then the flame-sensor circuit will be actuated by the flame to provide optical output to the photosensitive resistor of the signal transfer stage and to continue to hold the fuel supply means open so that fuel will continuously be supplied to the burner as desired.

Various novel combinations of one or more of the above-described types of circuits may be employed advantageously, in combination with particularly advantageous forms of output circuits, for operating fuel gas control apparatus, as described hereinafter in detail.

The above-described and other objects and features of the invention will be more readily understood from a consideration of the following detailed description, taken in connection with the accompanying drawings, in which.

Figures 1A, 1B, 2, 3, 4, 5, 6, 7, 9, 10, 11, 12, 13, 14:
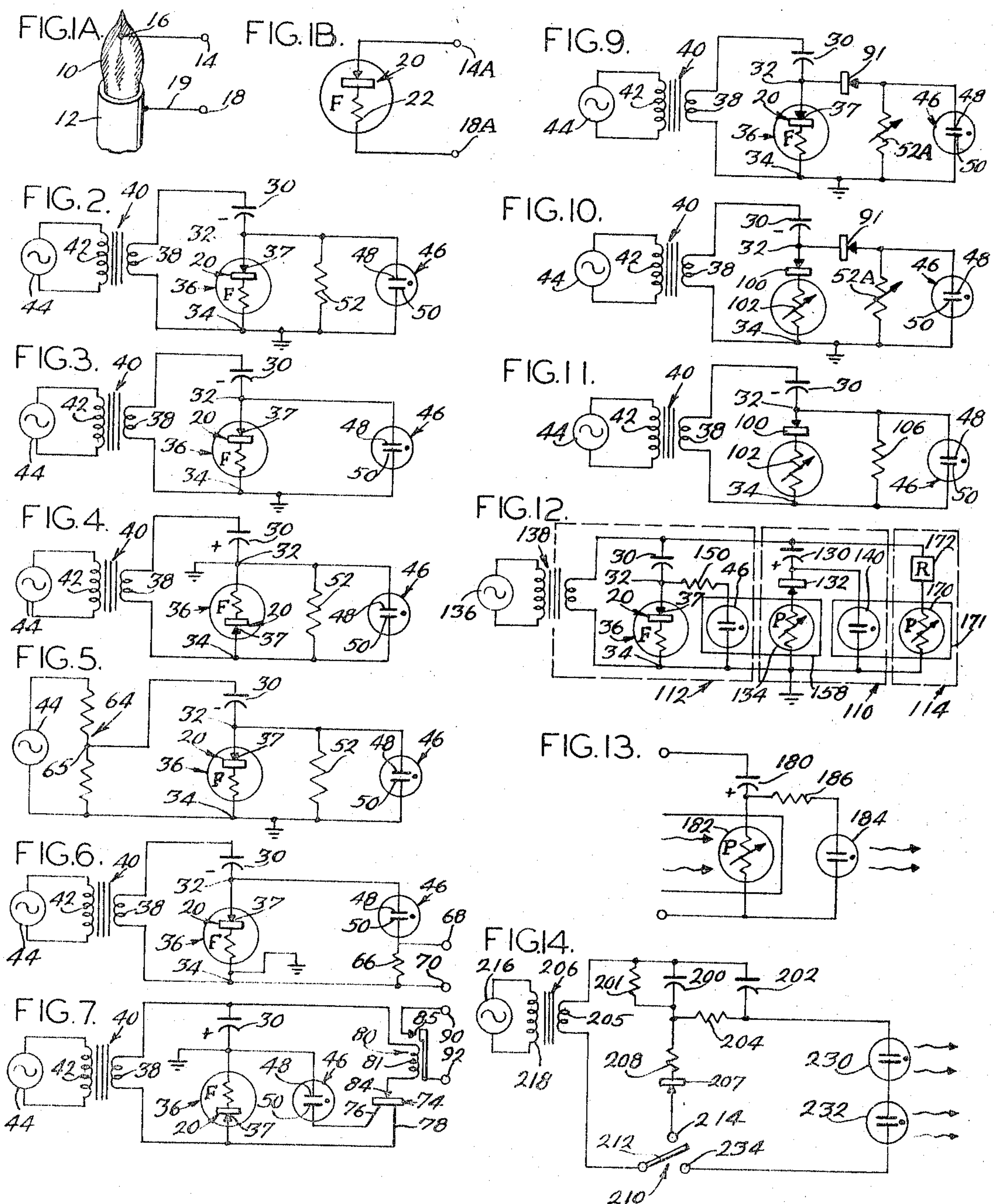
FIGURES 1A and 1B are, respectively, a perspective view of a flame with sensing electrodes contacting it and an electrical schematic of an equivalent circuit for the flame-electrode arrangement of FIGURE 1A.
FIGURE 2 is an electrical schematic diagram illustrating one basic form of flame-sensing circuit in accordance with the invention.
FIGURES 3–8 are electrical schematic diagrams illustrating various modifications and alternative forms for the flame-sensing circuit of FIGURE 2.
FIGURE 9 is an electrical schematic diagram of a form of the invention suitable for detecting certain characteristics of a flame.
FIGURE 10 is an electrical schematic diagram illustrating a form of the invention useful for providing indications of the value of resistance of a variable resistance element.
FIGURE 11 is an electrical schematic diagram of a form of the invention useful for producing indications of the occurrence of a particular low value of resistance of a variable resistance element.
FIGURE 12 is an electrical schematic diagram illustrating an electrical system in which a novel driver circuit in accordance with the invention in one aspect is utilized to operate an output circuit, in response to a flame-sensing circuit also constructed in accordance with the invention.
FIGURE 13 is an electrical schematic diagram illustrating a modified and simplified form of the driver circuit shown in FIGURE 13.
FIGURE 14 is an electrical schematic diagram of a circuit suitable for use as a "time-delay" circuit which operates to produce output signals only for a predetermined length of time following closing of a switch.

Referring now to the particular embodiments of the invention shown in the drawings, FIGURE 1A shows a flame 10 produced by burning of a fuel at the upper end of a burner base 12, a terminal 14 connected to a conductive probe element 16 extending into the top portion of the flame and a terminal 18 connected by lead 19 to the burner base 12. It is well known in the art that the flame 10 will provide a higher resistance to current flow for voltages applied between terminals 14 and 18 in one polarity than for the opposite polarity of applied voltage. In particular, the flame exhibits a substantially lower resistance when terminal 14 is positive with respect to terminal 18 than when the terminal voltages are reversed. The flame therefore acts as a rectifier of alternating electrical current. However, the flame is not a perfect rectifier in that there is some appreciable resistance remaining even in its direction of easier conduction, and in that some current flows even when the voltage is applied to the flame in the reverse or blocking direction. For the purposes of describing the present invention, it will be adequate to consider the flame as equivalent in electrical effect to a diode rectifier in series with a resistor, as shown in FIGURE 1B.

Accordingly, in FIGURE 1B the flame 10 is represented by an equivalent rectifier 20 in series with an equivalent resistor 22, the latter two elements being surrounded in the drawing by a circular line containing the letter F so as to designate clearly that a flame is represented rather than discrete circuit elements. Terminals 14A and 18A correspond to terminals 14 and 18 of FIGURE 1A, so that easier conduction occurs when 14A is positive with respect to 18A. The representation shown in FIGURE 1B will be utilized in other figures hereinafter to represent a flame to which connections are made in the manner indicated in FIGURE 1A.

FIGURE 2 illustrates a basic form of flame sensor in accordance with the invention in one aspect which produces an intermittent light output when a flame extends between a pair of terminals in the circuit, and no light output when the flame is absent or does not extend completely between the terminals.

More particularly, a capacitor 30 is connected in series with the terminals 32 and 34 between which the flame 36 extends. In this example the equivalent anode 37 of the flame 36 is connected directly to the capacitor 30. An alternating voltage input of instantaneous value V is applied across the series combination of capacitor 30 and flame 36 from the opposite ends of the secondary coil 38 of a transformer 40 the primary 42 of which is supplied with alternating current from a source 44, which may be a standard 115-volt A.C. line. Between terminals 32 and 34, and hence effectively in parallel with flame 36, there is connected a voltage-breakdown device consisting of a gaseous glow lamp 46 having two electrodes 48 and 50 therein and which changes from a non-conductive to a highly conductive state when the voltage applied between its electrodes 48 and 50 exceeds a critical firing voltage level and returns to its low-conduction state when the voltage applied between its electrodes falls below a predetermined extinction level. In this embodiment a resistor 52 is also disposed in shunt with the glow tube 46.

The zero-to-peak value $V_p$ of the alternating voltage supplied by transformer secondary 38 is selected with relation to the firing voltage $V_f$ of the glow lamp so that the firing voltage $V_f$ is greater than the zero-to-peak voltage $V_p$ but less than twice $V_p$. Because of this voltage relationship, neither the positive nor the negative swings of the alternating voltage input supplied by transformer secondary 38 is sufficiently large to fire glow lamp 46 in the absence of the rectifying action provided by the flame 36. Accordingly whether flame 36 is extinguished so as to produce an open circuit between terminals 32 and 34, or whether it is inadvertently short-circuited in some manner, no voltage exists in the sensor circuit which is capable of firing the glow lamp 46.

However, with flame 36 present and exerting its inherent rectifying action described above, the glow lamp will be fired repetitively in the following manner. Considering the voltage at the upper end of secondary transformer 38 with respect to its lower terminal, the latter of which may be grounded as shown, with capacitor 30 initially discharged the first positive half-cycle of the input sine wave of voltage produces a downward direction of conventional current flow through the series combination of the capacitor 30 and flame 36, i.e. a flow in the forward direction of the effective diode 20. During this positive half-cyle the lower plate of capacitor 30 charges negatively by way of the parallel combination of flame 36, resistor 52 and any current leakage path associated with the glow lamp 46, the latter path being inherently of very high resistance. During the negative half-cycle of the input voltage applied to the top plate of capacitor 30 with respect to ground, the direction of current flow is opposite and such as to tend to remove the charge on capacitor 30 and return the capacitor to its original uncharged state. This discharging is produced by a direction of conventional current directed from ground upward to the lower plate of capacitor 30 by way of the parallel paths presented by flame 36, resistor 52 and any leakage present in lamp 46.

Now if the circuit connected between terminals 32 and 34 is an ordinary bilateral resistance the discharging of capacitor 30 during each negative half-cycle of input voltage will equal the charging thereof occurring during the immediately-preceding positive half-cycle, there will be no net accumulation of charge on capacitor 30 at the end of a complete cycle, and no further accumulation of charge thereon during successive complete cycles. Under such conditions the maximum voltage applied across glow lamp 46 can never be greater than the zero-to-peak amplitude $V_p$ of the sine wave from transformer 40, and in fact may be somewhat less due to any A.C. voltage drop in the impedance of capacitor 30. This will be the situation, for example, when the flame 36 is absent or short-circuited, and under such conditions there will be no glow emitted by lamp 46 and no appreciable current through it. However, with flame 36 present between terminals 32 and 34 the resistance to current existing between terminals 32 and 34 is substantially smaller during the application of positive half-cycles of input voltage, when the lower plate of capacitor 30 is charging negatively, than during the negative half-cycles of input voltage during which the negative charge on the lower plate of capacitor 30 tends to be dissipated. As pointed out above, this is because the flame exhibits a lower resistance when terminal 32 is positive with respect to terminal 34 than for the reverse polarity of applied voltage. The result is that the negative charge accumulated on the lower plate of capacitor 30 during the first positive half-cycles of input voltage is greater than the charge dissipated from that plate during the next negative half-cycle of input voltage. Accordingly, a net negative charge remains on said lower plate, and, during successive cycles of input voltage, an increasing negative charge accumulates on said lower plate. As a result of this the total voltage appearing between terminals 32 and 34 comprises not only the alternating component from the input signal but also a D.C. component due to the accumulating of charge on capacitor 30 during successive cycles. The D.C. component of voltage which builds up at terminal 32 tends to increase toward a value substantially equal to the zero-to-peak value $V_p$ of the input sine wave and is negative, so that the total instantaneous negative voltage at terminal 32 during successive negative peaks of input sine wave increases from $V_p$ toward $2V_p$ as a maximum.

However, since as pointed out above the glow lamp 46 has a firing voltage $V_f$ greater than $V_p$ and less than $2V_p$, the lamp 46 fires and exhibits a very low resistance after a number of input-wave cycles and before the voltage at terminal 32 reaches its maximum negative instantaneous value of $2V_p$. Upon firing of lamp 46, a surge of current flows between the lower plate of capacitor 30 and ground by way of the lamp 46 and discharges capacitor 30 to a very low voltage. The glow lamp then extinguishes, and the complete cycle of operation is reinitiated, with charge accumulating on capacitor 30 to the point where the lamp 46 fires again. The continued repetition of this process produces an intermittent glow from, and current through, the lamp 46.

It is emphasized again that the firing of the glow lamp 46 can only occur when the charging resistance for capacitor 30 is different for positive half-cycles of input voltage than for negative half-cycles of input voltage, and hence can only occur when flame 36 with its rectifying characteristics is present in the circuit between terminals 32 and 34, and not when the flame is absent or effectively short-circuited. Further, lamp 46 cannot be caused to fire by a failure of other components of the sensor circuit, e.g. resistor 52, capacitor 30 or transformer secondary 38.

Accordingly either the pulses of light emitted by the glow lamp 46 when it fires, or the pulses of current flowing through it during firing, provide an unambiguous and reliable indication that flame 36 is present. Conversely, the absence of an optical glow from, and of current through, the lamp 46 constitutes a clear indication that the flame is absent or that a malfunction has occurred in the circuit components, and may therefore be advantageously used to operate alarm apparatus or automatically to cut off the supply of fuel to the flame 36.

In order to provide a distinct difference between the charging resistance for capacitor 30 between positive and negative half-cycles of input voltage, the forward resistance of flame 36 should be substantially lower than its reverse resistance and also is preferably low compared with the resistance of all other elements in shunt therewith. Such a relationship will give the largest useful difference between the equivalent resistance of the parallel combination of flame 36, resistor 52 and lamp 46 for the two opposite polarities of voltage applied across this combination. The greater this difference the greater the rate at which a net charge is accumulated on capacitor 30, and hence the greater the frequency with which the lamp 46 fires. The firing rate of lamp 46 also changes inversely with the capacity of capacitor 30, and by appropriate selection of the values of the circuit components can be made to equal the frequency of the applied input voltage, which typically is 60 cycles per second, or to occur at a sub-multiple of the input voltage.

Generally it is preferable that the value of capacitor 30 be sufficiently large that its reactance at the frequency of the input sine wave is small compared with the equivalent resistance of flame 36, resistor 52 and extinguished lamp 46 in parallel, even when the effective diode 20 of flame 36 is forward biased. If the latter relationship is not observed, then the zero-to-peak value $V_p'$ of the A.C. component of the voltage between terminals 32 and 34 and across lamp 46 will be substantially less than the corresponding value $V_p$ for the sine wave at the secondary 38 of transformer 40, with the result that while the D.C. component of the voltage between terminals 32 and 34 will still tend to rise toward the zero-to-peak voltage $V_p$ of the input wave, the total instantaneous voltage between terminals 32 and 34 will tend not toward a voltage $2V_p$ but toward a somewhat smaller value voltage $V_p+V_p'$ and the firing voltage $V_f$ of the glow lamp 46 will be selected accordingly between $V_p$ and $V_p+V_p'$. In this case the criterion for selection of the critical firing voltage $V_f$ is that it be greater than the voltage $V_p$ but less than $V_p$ plus the zero-to-peak amplitude $V_p'$ of the A.C. component applied across the lamp 46 in the polarity to reverse bias the flame rectifier.

On the other hand, where it is desired or necessary that the lamp 46 fire at a high frequency, for example on each cycle of the alternating voltage input, the capacitor 30 must be charged rapidly, and more rapid charging occurs when the value of capacitor 30 is made smaller. Accordingly for any given application a suitable value for capacitor 30 may be determined by appropriate compromise with the foregoing considerations in mind.

The flame sensor in FIGURE 2 is not only extremely reliable but is also very simple in form and inexpensive, and especially adapted for use with other light-sensitive apparatus such as described hereinafter. For these reasons it is particularly suitable for use in a flame-sensing control system for shutting-off the supply of gas to a burner when the burner flame is extinguished, as described also in detail hereinafter.

The resistor 52 shown in FIGURE 2 in parallel with the glow lamp 46 is typically of very high value, such as 100 megohms for example, and serves to provide a beneficial stabilizing action on circuit operation. In one typical example, source 44 provides standard 115-volts A.C., which is reduced by transformer 40 to a zero-to-peak voltage of about 75 volts at secondary 38 and applied across the series combination of a gas flame and a capacitor 30 having a value of the order of hundredths of a microfarad, the lamp 46 being a type NE–2H General Electric neon glow lamp and resistor 52 having a value of 100 megohms. The resultant glow lamp frequency is of the order of 5 to 60 cycles per second depending on the quality of rectification provided by the flame.

Various modifications and variations of the basic circuit of FIGURE 2 may be used advantageously in various applications, some of which will now be set forth in connection with other figures hereof. For example, FIGURE 3 shows a form of the invention which is identical with that of FIGURE 2 with the exception that it is even simpler in that the resistor 52 has been eliminated, this circuit operating in generally the same manner as described above in connection with FIGURE 2, although the resistor 52 in the FIGURE 2 adds stability to the operation.

FIGURE 4 shows an arrangement which is like FIGURE 2 with the exception that the polarity of the rectifying action provided by flame 36 is reversed from the arrangement of FIGURE 2, as will occur when the connections to the flame electrode and burner are reversed. The effect of this is to reverse the polarity of charging of the capacitor 30 and hence to cause the glow lamp 46 to operate in response to the occurrence of the positive half-cycles of input sine wave, rather than in response to the negative half-cycles. The ground connection is again made to the cathode side of the flame diode, since the burner base is typically grounded in practice.

The arrangement of FIGURE 5 is like that of FIGURE 2 with the exception that the transformer 40 has been replaced by a voltage divider 64 from which an appropriate level of input voltage is derived at a tap 65 in conventional manner, for application to the sensor circuit.

The arrangement of FIGURE 6 is like that of FIGURE 3 with the exception that a resistor 66 of small value has been inserted in series between ground and the lamp 46, so that the surges of current flowing through lamp 46 when it fires produce voltage pulses across the resistor 66 which are applied to output terminals 68 and 70 to provide voltage indications of the presence of the flame 36.

The arrangement of FIGURE 7 is like that of FIGURE 3 with the exception that the polarity of the flame diode 36 is reversed, and there are provided a silicon controlled rectifier 74 having its gate and cathode elements 76 and 78 respectively connected in series with glow lamp 46 and a relay 80 having its actuating coil 81 in series between the anode 84 of the silicon controlled rectifier and the upper plate of capacitor 30. With rectifying flame 36 present, the pulses of current occurring intermittently through the glow lamp 46 actuate the gate element 76 of normally non-conductive silicon controlled rectifier 74 to permit current through relay coil 81 and to close the relay contacts 85. A controlled circuit connected to output terminals 90 and 92 of relay 80 can thereby be completed automatically whenever the flame is present to produce firing of lamp 46, and opened automatically whenever flame 36 is absent or the circuit contains a malfunctioning component. Typically for this embodiment capacitor 30 has a value of 0.005 microfarad, lamp 46 is a General Electric Co. type NE–2H neon glow lamp, and the zero-to-peak value of the sinusoidal input alternating voltage is from about 60 to 105 volts.

Figure 8:
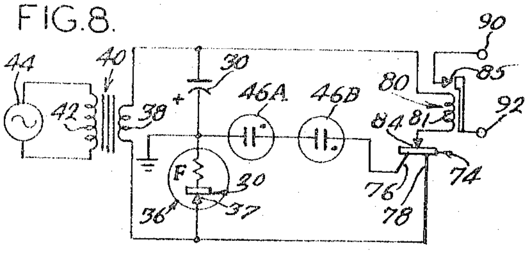

FIGURE 8 shows a circuit like that of FIGURE 7 with the exception that the single glow lamp of FIGURE 7 is replaced by the series combination of two similar glow lamps 46A and 46B, and the transformer 40 provides a higher input voltage. In particular, source 44 may again be a standard 115-volt A.C. source and transformer 40 a 1:1 transformer for applying full line voltage to the flame sensor circuit. The two series-connected glow lamps operate with a firing voltage of twice that of a single lamp and make possible operation with full line voltage applied to the sensor circuit, as is advantageous in certain practical applications.

The above-described flame-sensing circuits are suitable for any of a large variety of applications to provide, for example, optical, electrical or mechanical indications of the presence or absence of flame. While an important application of the invention is to flame-sensing and fuel-control systems for fuel burners as mentioned above, there are many other uses for the circuit including, for example, fire alarm systems.

FIGURE 9 illustrates a circuit arrangement like that of FIGURE 2 with the exception that the fixed resistor 52 has been replaced by a resistor 52A which is controllably variable, as by manual operation for example, and a diode rectifier 91 has been inserted between terminal 32 and the upper interconnection between lamp 46 and variable resistor 52A, in the opposite polarity to the flame diode 20. The circuit arrangement of FIGURE 9 is particularly useful for deriving indications of certain characteristics of flame 36. The use of a diode rectifier 91 in the position shown causes the current which charges negatively the lower plate of capacitor 30 to flow entirely through the resistance of flame 36, and causes most of the oppositely-directed current to flow by way of resistor 52A and lamp 46 in parallel; because lamp 46 when extinguished has an extremely high leakage resistance, substantially all of the discharging curernt through diode 91 in fact flows through the variable resistor 52A. Since the firing of lamp 46 depends upon a difference in the resistance of the path between ground and the lower plate of capacitor 30 for positive and negative half-cycles of input voltage, lamp 46 will not fire even with the flame 36 present when the resistance of variable resistor 52A is made low enough. Accordingly, by varying variable resistor 52A until lamp 46 no longer fires, and by noting the value of resistor 52A for which firing of lamp 46 first stops, an indication is obtained of the effective resistance 22 of flame 36 in its forward-biased direction, and hence of the rectification efficiency of the flame. This is useful not only in connection with experimental investigations but also in connection with designing suitable flame-sensing apparatus. More precise information as to the flame characteristics can be obtained by calibrating the circuit with specific components and a specific span of flame resistance of interest in a particular application.

FIGURE 10 shows an embodiment of the invention in which a flame is not a necessary part of the circuit, and which is the same as FIGURE 9 with the exception that the flame between terminals 32 and 34 is replaced by the series combination of a diode rectifier 100 and a condition-sensitive resistor 102, which may for example have a heat-sensitive resistance, a humidity-sensitive resistance or a photosensitive resistance. From the electrical viewpoint the circuit of FIGURE 10 is the same as that of FIGURE 9 with the exception of the variability of resistor 102 and the generally somewhat superior blocking characteristics of the diode rectifier 100 when reverse biased. As in the case of the arrangement of FIGURE 9, there will be a value for the variable resistor 52A for which glow lamp 46 will change between its actuated and non-actuated conditions. For example, when the value of resistor 52A is very high, the resultant difference in the charging and discharging resistances for capacitor 30 will cause the accumulation of a negative charge on the lower plate of capacitor 30 as explained above, and resultant repetitive firing of lamp 46, while for a very low value of resistor 52A lamp 46 will not fire. As one example of possible applications of the circuit, variable resistor 52A may be set at a value $R_{52A}$ originally smaller than the value $R_{102}$ of condition-sensitive resistor 102 such that, when $R_{102}$ drops to a value appreciably lower than $R_{52A}$ due to illumination, heat, humidity or the like, the glow lamp 46 will be fired repetitively. By suitable initial adjustment of the value of resistor 52A the glow lamp may be caused to begin firing for any desired predetermined value of illumination, temperature, humidity or the like.

The circuit has advantages similar to those described in detail above with respect to FIGURE 2 in that failure of the diodes and capacitor, whether by short-circuiting or open-circuiting, will not produce at the output false indications of lowering of the value of resistor 102 because of the above-described relation between the zero-to-peak value of the input alternating voltage and the firing voltage of the glow lamp. Furthermore, the output is in the form of an intermittent glow which can conveniently be utilized to operate other control circuitry optically coupled thereto. In addition it has the important advantage that it is especially well adapted for use with a condition-sensitive element 102 which is of very high resistance, even in its lower-resistance state for which output signals are to be produced. For example condition-sensitive resistor 102 may have a value of 30 megohms in its highest resistance state and produce intermittent firing of lamp 46 when its resistance drops to 5 megohms.

The embodiment of FIGURE 10 is susceptible to a large number of variations which will occur to one skilled in the art, particularly in view of the foregoing discussion of the preceding figures. For example, by interchanging the positions of variable resistance 52A and condition-sensitive resistor 102 the lamp 46 can be caused to fire when the value of resistor 102 rises above, rather than falls below, a predetermined level. By connecting lamp 46 directly between terminals 32 and 34 instead of by way of diode 60, the lamp 46 can be caused to fire for departures in either direction from a predetermined value of the resistance of resistor 102, the lamp being fired by one polarity of voltage across it for one direction of deviation of the resistance of resistor 102 and being fired by the opposite polarity of voltage across it for the opposite direction of deviation of resistance.

In FIGURE 10 it is also contemplated that variable resistor 52A may be calibrated so that its value of resistance can be read quickly for any adjustment thereof. If then the resistance of condition-sensitive resistor 102 is slowly changing or substantially constant for appreciable periods of time, resistor 52A can be adjusted to the value for which lamp 46 just fails to fire, at which time the indicated value of resistor 52A will provide an indication of the resistance of condition-sensitive resistor 102 according to the calibration previously made of the circuit. This will enable periodic continuous monitoring of the condition to which resistor 102 is sensitive, rather than merely providing indications of whether it is above or below a predetermined value.

The arrangement of FIGURE 11 is like that of FIGURE 10 with the exception that diode 91 has been removed and resistor 106 is fixed, rather than variable as in the case of resistor 52A. While simpler in these respects than the circuit of FIGURE 10, it can be used for some of the same purposes, such as providing output indications from lamp 46 of whether the resistance of condition-sensitive resistor 102 is above or below a predetermined value. For example, the system can be calibrated by initially replacing condition-sensitive resistor 102 with a resistor having the value for which it is desired to have the lamp 46 change from its non-firing to its firing condition and then trying a number of different values of resistor 106 until the resistance value is found for which lamp 46 just begins to fire repetitively. When the condition-sensitive resistor 102 is then placed in position as shown, lamp 46 will begin to fire intermittently whenever the resistance of condition-sensitive resistor 102 falls to the value of the previously-substituted resistor for which the system was calibrated in the manner described. The advantages with respect to fail-safe operation are similar to those for the circuit of FIGURE 10.

FIGURE 12 illustrates a signal transfer circuit 110 embodying the invention and designated in this embodiment for convenience as a driver because of its utility in driving an output circuit, and which is especially adapted to receive input signals from a flame sensor 112 and to apply output signals to the output circuit 114. The driver 110 in this form comprises a capacitor 130 in series circuit with a diode rectifier 132 and a photoconductive element 134, alternating voltage from source 136 being applied by way of transformer 138 across said series circuit and a voltage-breakdown device in the form of glow lamp 140 being connected in parallel with the series combination of rectifier 132 and photoconductive element 134. Electrically the driver 110 is similar to the arrangement described in connection with FIGURE 11, except that the polarity of the diode 132 is reversed from that shown in FIGURE 11, the resistor 106 is not employed in this particular embodiment, and the condition-responsive resistor 102 of FIGURE 11 is specifically a photoconductive element 134 as indicated by the letter P in the drawing. The firing voltage of glow lamp 140 is between once and twice the zero-to-peak voltage of the alternating voltage input from the secondary of transformer 138.

The basic principle of operation of the driver 110 is similar to that described hereinbefore in that, when the resistance of photoconductive element 134 is small compared with the leakage resistance of the glow lamp 140, the resistance between ground and the lower plate of capacitor 130 is different for positive and negative half-cycles of the input sine wave from source 136, so as to cause the accumulation of charge on capacitor 130 until lamp 140 fires in response to one of the half-cycles of input voltage. In this example the diode rectifier 132 is poled in the same direction as the flame rectifier in FIGURE 4 and, as described in connection with the latter figure, causes the accumulation of positive charge on the lower plate of capacitor 130 until the glow lamp 140 fires in response to a positive half-cycle of input voltage. In the absence of illumination falling on photoconductive element 134, the latter resistor has such a high value of resistance that firing of glow lamp 140 occurs at a very low frequency or not at all. This is due to the fact that net charge can then accumulate on capacitor 130 at most at a very slow rate. However, when illumination falls upon photoconductive element 134 its resistance decreases greatly, so that capacitor 130 charges rapidly when the diode rectifier 132 is biased in its forward direction by the input sine wave, i.e. during negative half-cycles of input voltage. In the present example, illumination for photoconductive element 134 is provided by the glow lamp 46 of flame-sensor circuit 112, which latter circuit is identical with that shown in FIGURE 3 with the exception that a small series resistor 150 has in this case been included in series with the glow lamp 46 for the purpose of limiting the current flowing through the lamp when fired. Photoconductive element 134 is exposed to the light from lamp 46 and shielded from other light, as by placing both lamp 46 and photoconductive element 134 in a common light-shielding enclosure 158.

In this example the resistance of photoconductive element 134 when illuminated by lamp 46, and the value of capacitor 130, are preferably chosen so that a single half-wave of negative input voltage at the top of capacitor 130 is sufficient to charge capacitor 130 to a voltage such that the immediately subsequent positive half-cycle of input voltage will fire lamp 140. As a result, lamp 140 will fire at the frequency of source 136, which is typically 60 cycles per second. In order for firing of lamp 140 thus to occur at the frequency of the input sine wave voltage in cases in which the flame sensor glow lamp fires at a sub-multiple of the input sine wave, the phototconductive element 134 should have a decay time comparable to or longer than the time between successive glows from the flame sensor circuit, so that once the photoconductive element is changed to its low-resistance state by light from lamp 46 it does not change significantly from its low-resistance state before the next pulse of light from lamp 46. Cadmium sulfide constitutes a suitable photoconductive material for producing firing of lamp 140 on each positive cycle of a 60-cycle input sine wave when the firing rate of lamp 46 is about 10 times per second.

Light produced by firing of glow lamp 140 is optically coupled to the photoconductive element 170 of the output circuit 114, as indicated by the light shield 171 surrounding lamp 140 and photoconductor 170. Photoconductive element 170 is connected in series with relay 172 across the secondary of transformer 138 so that current is passed through the control element of relay 172 to an extent sufficient to actuate it only when photoconductive element 170 is in its low-resistance condition. Accordingly relay 172 will be actuated only when a flame is present in flame-sensor circuit 112, and may be used to operate other control apparatus, for example to hold open a gas supply line for supplying gas to the flame sensed by circuit 112.

It is noted that both driver 110 and output circuit 114 provide power amplification to assist in the reliable operation of relay 172, which is preferably of a high resistance, low-current type. Driver circuit 110 also stabilizes the actuating current through the relay by causing the pulses of light from glow lamp 140 to occur at a regular rate equal to the input sine wave frequency. Photoconductive element 170 may be a "slow" photoconductor when relay 172 is an A.C. relay actuable in response to alternating current, and is preferably a "fast" photoconductor when relay 172 is of a type which operates only in response to uni-directional current pulses.

FIGURE 13 illustrates a simplified form of driver circuit 110, which can be substituted for the driver 110 in FIGURE 12 and is simpler in that no diode is required. In this case the input sine wave is applied across the series combination of the capacitor 180 and the photoconductive element 182, and glow lamp 184 is connected in parallel with photoconductive element 182 by way of resistor 186. In this case the photoconductive element 182 responds to light sufficiently fast that its resitsance can change substantially in the period of one-half cycle of the input sine wave. Cadmium selenide is an appropriate photoconductive element for this purpose. During the negative half-cycles of the input sine wave, light impulses are applied to photoconductive element 182, as from flame sensor 112, to reduce its resistance, and during positive half-cycles of input sine wave photoconductive element 182 resumes its high-resistance condition. The resultant change in resistance of photoconductive element 182 during successive half-cycles of the input sine wave causes the lower plate of capacitor 180 to accumulate poistive net charge each time photoconductive element 182 is illuminated and to cause firing of glow lamp 184 during positive half-cycles of input waveform when the charging of capacitor 180 has proceeded sufficiently. Resistor 186 is for the purpose of increasing the discharge time constant for capacitor 180, so that lamp 184 will fire on each input voltage cycle even though the flame sensor produces glow at a sub-multiple of the input voltage frequency. Photoconductive element 182 can be illuminated, during negative cycles of input voltage, at the input voltage frequency or at a sub-multiple thereof, and the choice of circuit values, magnitude of input voltage and firing voltage of lamp 184 can be selected so that lamp 184 fires each time photoconductive element 182 is illuminated or only after a number of such illuminations. In other applications, photoconductive element 182 can be illuminated during positive half-cycles to cause lamp 184 to fire on negative half-cycles. Other variations in the circuit arrangement will be apparent to one skilled in the art in view of the foregoing teachings.

FIGURE 14 illustrates an embodiment of the invention which provides one or more actuations of a voltage-breakdown device following closing of a switch, and then automatically discontinues such actuations until the switch has been re-opened and re-closed. In particular, in this embodiment it produces one glow for each negative half-cycle of input alternating voltage for a predetermined delay time following closing of a switch. While such a circuit has a large variety of possible applications, it is especially advantageous in connection with control of fuel ignition and burning systems to maintain an initial supply of fuel to a burner for a predetermined time interval even if ignition has not occurred, and then to discontinue such fuel supply automatically.

In this form of time-delay circuit capacitor means, comprising capacitor 200 shunted by resistor 201 and capacitor 202 connected in parallel with capacitor 200 by way of resistor 204, are connected in series with the secondary 205 of transformer 206 by way of diode rectifier 207 and resistor 208 and a double-throw switch 210 when the switch arm 212 is in its upward position to contact terminal 214. An alternating-voltage source 216, such as a 115-volt A.C. line, supplies the primary 218 of transformer 206. With switch arm 212 in its upward position, the input alternating voltage charges capacitor 200 so that its lower plate is positive, until the D.C. voltage from the lower plate to switch arm 212 substantially equals the zero-to-peak value of the negative polarity of the alternating voltage from secondary 205. A pair of glow lamps 230 and 232 are connected in series between the lower plate of capacitor 202 and the lower terminal 234 of switch 210, so that when switch arm 212 is moved from contact with terminal 214 to contact with terminal 234 the series combination of glow lamps is initially supplied with the full D.C. voltage previously developed by the capacitive means as described above plus an alternating-voltage component from transformer primary 205. The firing voltage of the series combination of glow lamps is greater than the zero-to-peak value of either polarity of the alternating voltage component applied thereto but less than the sum of the D.C. voltage initially applied thereto by the capacitive means plus the zero-to-peak amplitude of the poistive polarity of alternating component applied thereto from transformer secondary 205.

Accordingly, when switch arm 212 is moved to its downdard position the glow lamps fire on the initial positive half-cycle of alternating input voltage. This causes capacitor 202 to discharge substantially completely. However, during the remainder of the cycle of alternating voltage when the lamps are extinguished, capacitor 202 is re-charged from capacitor 200, the value of which is preferably large compared with that of capacitor 202. The glow lamps then fire again and the process repeats until capacitor 200 is sufficiently discharged that the total voltage across the glow lamps no longer exceeds their firing voltage at any point in the cycle, after which the lamps are no longer fired. Resistor 208 merely serves to limit the magnitude of the charging current, while resistor 201 helps establish a sharp and definite end to the time-delay interval.

Switch 210 may for example be a manually-operable switch, or a relay-energized switch normally closed to terminal 214 operated by a thermostat to assume its alternate position when the temperature falls below a predetermined level. The optical output from the glow lamps can then be used to open a gas supply valve, for example. The duration of the time-delay increases with increases in the amount of charge stored by capacitor 200, and hence with increases in the value of capacitor 200.

In one embodiment of this time-delay circuit the time-delay varied with value of capacitor 200 as follows.

| Value of capacitor **200** in microfarads: | Delay time in seconds |
|---|---|
| 2 | 3.5 |
| 4 | 8.8 |
| 10 | 20.1 |
| 14 | 29 |
| 20 | 52 |

Figure 15:
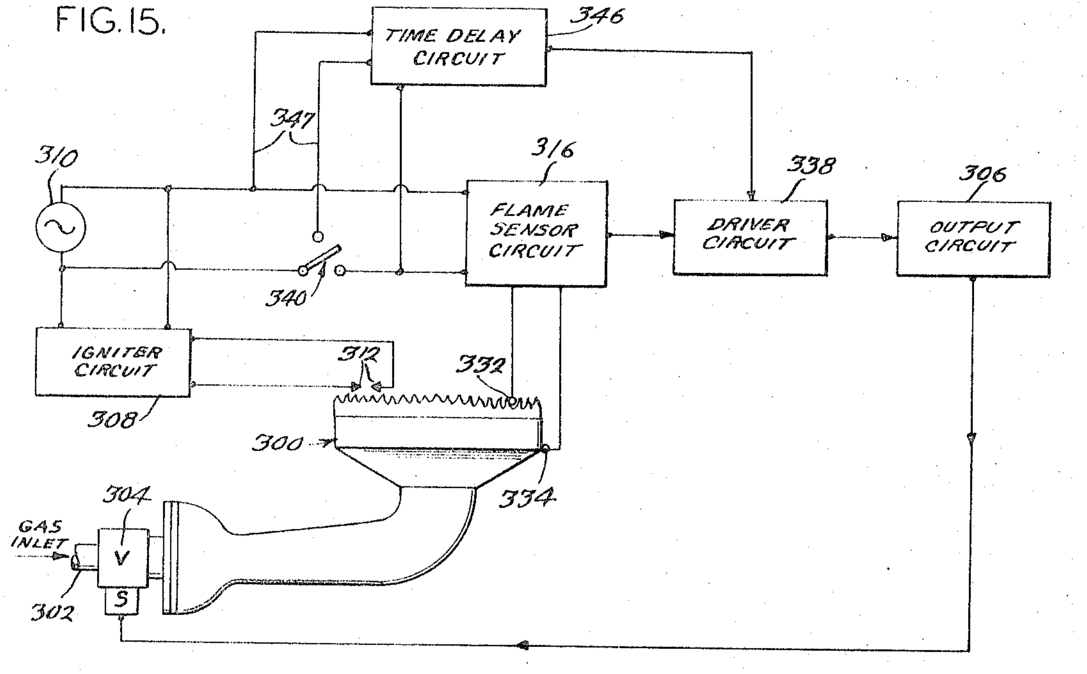
FIGURE 15 is a schematic diagram, principally in block form, illustrating a fuel burner and control system therefor to which reference will be made in explaining certain specific applications of the invention.

Having described a number of basic forms of the invention and a number of possible variations in the circuitry thereof, there will now be described several ways in which these basic forms can be combined with each other or utilized individually in a flame-sensing fuel control system. Referring to FIGURE 15, there is shown one form of system to which the invention may be applied. A fuel burner 300, in this example a gas burner, is supplied with gas at a gas inlet 302 by way of a solenoid-controlled gas valve 304, the mechanical portion of which is indicated by the letter V and the solenoid portion of which is indicated by the letter S. The solenoid valve 304 is normally closed and is opened only by current applied to solenoid S from an output circuit 306. An igniter circuit 308 is supplied with electrical input power from alternating-current source 310 and provides high voltage between spark electrodes 312 positioned just above the burner 300 so as to ignite gas emanating from the burner. Igniter circuit 308 can operate continuously or can be arranged to operate only for a predetermined time when valve 304 is first opened, by conventional means. A flame-sensor circuit 316 is provided which includes connections to a pair of flame-sensing electrodes 332 and 334, corresponding to terminals 32 and 34 of FIGURE 2, electrode 334 being connected to the base of burner 300 and electrode 332 being placed immediately above the burner so that when a flame is present it will be contacted by the flame. Flame-sensor circuit 316 is also supplied with operating input electrical power from source 310 and produces output signals which are coupled to driver circuit 338 and thence to output circuit 306 so that so long as flame-sensor circuit 316 senses the presence of a flame at burner 300 the output circuit 306 is actuated and operates the solenoid of valve 304 to hold the latter valve open and continue the supply of gas to the burner 300.

A double-throw switch is located in series with the power line to the flame-sensor circuit so that when the switch is in its upward position the flame-sensor circuit is rendered inoperative, there is no output from output circuit 306, and valve 304 is allowed to return to its normally-off condition for which gas flow is prevented. Although when the switch 340 is thrown to its downward position flame-sensor circuit 316 is rendered operative, there is then no flame present at burner 300 to be sensed by flame-sensor circuit 316 and the gas valve is therefore not opened by the flame-sensor circuit. However, time-delay circuit 346, which is also supplied with operating electrical input power from source 310 by leads 347, also has its output coupled to driver circuit 338 and responds to the downward throw of thermostatic switch 340 momentarily to operate and to actuate output circuit 306 and the solenoid of valve 304, thereby permitting gas to enter the burner and to be ignited by the ignition electrodes 312. Time-delay circuit 346 automatically becomes inoperative after a predetermined delay time so that if ignition has not been accomplished within the delay time the valve 304 will automatically return to its closed position thus preventing the escape of un-burned gas.

Each of the elements of FIGURE 15 can comprise conventional apparatus for providing the above-described system functions. However, advantageously any one of the circuits of FIGURES 2–8 may be used for the flame-sensor circuit 316, either of driver circuits of FIGURES 12 and 13 may be used as driver circuit 338, and the time-delay circuit of FIGURE 14 may be used for time-delay circuit 346 in FIGURE 15. The circuit of FIGURES 7 and 8 may be used not only for flame-sensor circuit 316 but also to replace output circuit 306 in certain embodiments of the invention.

As will now be described however, particularly advantageous system arrangements are obtained by certain combinations among the time-delay circuit, flame sensor circuit and driver circuit of the invention.

Figure 16:
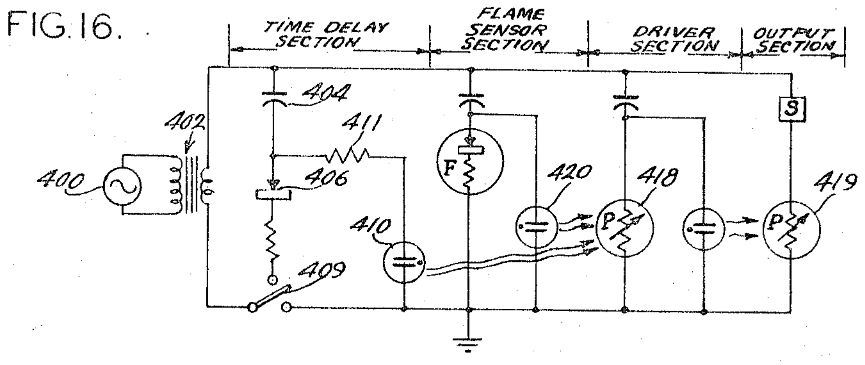
FIGURES 16, 17 and 18 are electrical schematic diagrams of electrical portions of flame-sensing fuel-control systems, embodying the invention.

Referring now to FIGURE 16, the circuit shown therein may be used as the time-delay circuit 346, the flame sensor circuit 316, the driver circuit 338 and the output circuit 306 of FIGURE 15. Again, a source of alternating voltage 400 is connected by way of a transformer 402 to each of the time-delay, flame-sensor, driver and output sections of the circuit.

The time-delay section comprises the series combination of capacitor 404, diode 406 and switch 409, together with glow lamp 410 and current-limiting resistor 411 connected in parallel with the series combination of the diode rectifier 406 and switch 409. The required long discharge time-constant for capacitor 404 is provided by a very large value of capacitor 404. The flame-sensor section, driver section, and output section are substantially identical with circuits described earlier herein. The photoconductive element 418 in the driver section is optically coupled not only to the glow lamp 420 of the flame-sensor section but also to the glow lamp 410 of the time-delay section. In FIGURE 16 and subsequent figures the optically-coupled elements are indicated by the wavy arows joining them. The operation of each of the individual sections is again substantially the same as that described in earlier figures, and hence only the over-all operation need here be described in detail.

When switch 409 is thrown to its upward position, capacitor 404 of the time-delay section charges as described previously. During this time glow lamp 410 does not operate because it is disconnected by switch 409. However when switch 409 is thrown to its downward position glow lamp 410 fires intermittently throughout a predetermined delay time, for example ten seconds, on each negative half-cycle of input voltage and, since its output is optically coupled to the photoconductive device 418 of the driver section, the driver section supplies optical glow, during each positive half-cycle of input voltage, to the output section to reduce the resistance of photoconductive element 419; this actuates the solenoid S, and opens the gas valve supplying gas to the burner. If during the delay time during which time-delay glow lamp 410 fires the gas igniter is not effective to ignite gas from the burner, the flame sensor will remain inoperative and will not act to fire glow lamp 420; hence the gas valve will return to its off state. However, if the igniter operates to ignite the gas as intended within the delay time, then the flame sensor will detect the flame and operate to fire glow lamp 420 intermittently before the end of the time-delay period. As a result, photoconductive device 418 will be illuminated by flame-sensor lamp 420 and solenoid S will be continuously actuated to maintain the gas valve open as is desired for burning of the fuel. When the switch 409 is thrown back to its upward position the cycle repeats itself.

The arrangement of FIGURE 16 therefore operates with the previously-described advantages involving a high degree of freedom from false signals which would hold the gas valve open, and simple, relatively uncomplicated circuitry, and without requiring the use of transistors or vacuum tubes.

Figures 17, 18:
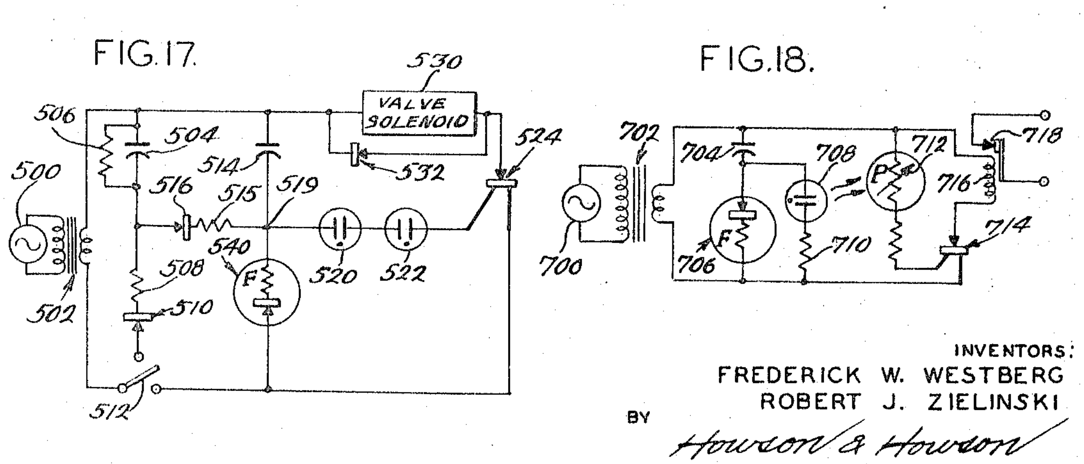

FIGURE 17 illustrates a novel combination time-delay, flame-sensing and valve-actuating circuit in accordance with the invention which is particularly simple and effective. In this case the source of alternating voltage 500 supplies an alternating voltage input through transformer 502 to the series combination of relatively larger valued capacitor 504 in shunt with resistor 506; resistor 508; rectifier diode 510; and double-throw switch 512. A relatively-smaller valued capacitor 514 is connected in parallel with capacitor 504 by way of resistor 515 and rectifier 516, the latter rectifier being poled oppositely to rectifier 510 with respect to the lower plate of capacitor 504. The interconnection 519 of resistor 515 is connected to switch 512 by way of the series combination of the two glow lamps 520 and 522 and the gate and cathode terminals of silicon-controlled rectifier 524. The portion of the circuit just described operates to charge capacitors 504 and 514 when the arm of switch 512 is in its upward position and, when the arm is thrown to its downward position, produces intermittent pulses of current through glow lamps 520 and 522 and through the gate-cathode path in silicon-controlled rectifier 524 for a predetermined delay time. The anode of silicon-controlled rectifier 524 is connected to the upper plate of capacitor 514 by way of the valve solenoid 530 in shunt with the chatter-preventing rectifier 532. Accordingly during the delay time the valve solenoid is operated continuously to supply gas to a burner.

In addition the flame 540 produced by ignition of gas from the burner is connected between the interconnection 519 and the lower switch terminal of switch 512 with its effective anode upward. It will therefore be seen that flame 540, lamps 520 and 522, silicon-controlled rectifier 524 and valve solenoid 530 cooperate with capacitor 514 in the same manner as in the flame-sensor circuit of FIGURE 8 when the delay time is over and switch 512 is in its downward position, the diode rectifier 516 serving to isolate the flame 540 electrically from the earlier portion of the circuit including large capacitor 504 at this time. Accordingly the valve solenoid 530 remains actuated by the flame if the flame is present at the end of the delay time, so that gas supply for the flame is maintained. The previously-described relations between the firing voltage of the two glow lamps and the alternating and direct voltages applied thereto are again provided, with the advantages previously described. In this case the flame-sensor utilizes the capacitor 514, lamps 520, 522 and the silicon-controlled rectifier 524 in common with the time-delay circuit with resultant simplification of circuitry.

FIGURE 18 shows a simplified form of flame sensor and control circuit which is similar to that illustrated in FIGURE 7, although the silicon-controlled rectifier is turned on not by current through the glow lamp but by current through a photoconductive element the resistance of which is controlled by light from the glow lamp. More particularly, the alternating current source 700 is connected by way of the transformer 702 to the series combination of capacitor 704 and flame 706, the glow tube 708 and resistor 710 being connected as a series combination in parallel with flame 706. As described previously, such a circuit constitutes a flame-sensor which will produce intermittent current pulses through the glow tube 708 upon the occurrence of negative half-cycles of the input voltage, although not necessarily for each such negative half-cycle. The resultant light output of glow lamp 708 is optically coupled to photoconductive element 712, the latter element in turn being connected in series with the gate and cathode elements of silicon-controlled rectifier 714, the latter series combination being connected across the input alternating voltage lines. The anode of silicon controlled rectifier 714 is connected to the upper alternating-voltage supply line by way of relay control coil 716, the relay contacts 718 for which are actuated to a closed position by current through coil 716. In the absence of glow from glow lamp 708, photoconductive element 712 has a high resistance and prevents current flow through the gate of the silicon controlled rectifier; the latter device therefore remains substantially nonconductive between its anode and cathode elements. However, upon the occurrence of a pulse of light from glow lamp 708 the resultant decrease in resistance of photoconductive element 712 permits a current pulse to pass to the gate of silicon controlled rectifier 714, turning it on, and resulting in a corresponding pulse of current through relay control winding 716 to close the relay contacts 718. Again the relay contacts may be utilized for any control purpose, and in particular to control the opening of a gas valve supplying gas to a burner. Because the amount of current required to be supplied to the gate of the silicon controlled rectifier 714 to turn it on is very small, typically of the order of 5 milliamperes, this simple arrangement can be utilized and the complexity of intervening amplifying stages avoided.

Each of the foregoing circuits of the invention employs a basic principle of the invention in accordance with which a voltage threshold device, ordinarily a glow lamp, is operated by the voltage appearing at one plate of a capacitor to which alternating current is supplied by way of a resistance which is different for one polarity of alternating current than for the other, with the result that the voltage at said plate of the capacitor acquires a D.C. component in addition to the alternating component until the sum of the two components acting in the same direction is sufficient to actuate the voltage threshold device. The voltage threshold device therefore operates only when the circuit includes a rectifying element, and the circuit is safe from false indications because, in general, there is no other source of voltage in the circuit large enough to fire the voltage breakdown device even if the circuit components are functioning improperly. The simplicity and reliability of operation will also be apparent from the foregoing description.

While the invention has been described with specific reference to particular embodiments thereof in the interests of complete definiteness, it will be understood that it may be embodied in any of a large variety of other forms without departing from the scope and spirit of the invention as defined by the appended claims.

We claim:

1. An electrical circuit for detecting the presence or absence of a flame, comprising:

a pair of flame electrodes positioned adjacent a source of a flame of rectifying characteristics so as to provide electrical contact to spaced regions of said flame when said flame is present;

a source of an alternating voltage of predetermined maximum peak-to-peak amplitude;

capacitive means connected in common series circuit with said source and said flame electrodes; and voltage-breakdown means having a pair of discharge-electrode means connecting said voltage-breakdown means in parallel with said flame electrodes, said voltage-breakdown means being characterized by a firing voltage which, when applied between said discharge-electrode means while said voltage-breakdown means is in its low-conduction state will change said voltage-breakdown means to its high-conduction state, and also characterized by an extinction voltage which when applied between said discharge-electrode means while said voltage-breakdown means is in its high-conduction state will change said voltage-breakdown means to its low-conduction state;

said common series circuit being responsive to said alternating voltage when said flame is present to charge said capacitive means with a direct-voltage component of a given sign in response to one polarity of said alternating voltage and to add to said direct-voltage component a varying component of the same sign during the occurrence of the opposite polarity of said alternating voltage, whereby the total voltage applied between said discharge-electrode means during said occurrence of said opposite polarity rises to a value greater than that of either polarity of said alternating voltage alone and greater than said firing voltage of said gas-discharge means, said common series circuit being responsive to said alternating voltage in the absence of said flame to generate a voltage for application between said discharge-electrode means which is no greater than the peak value of either polarity of said alternating voltage;

said firing voltage being greater than the zero-to-peak value of either polarity of said alternating voltage but less than the peak-to-peak value thereof, whereby said voltage-breakdown means is changed to its high-conduction state only when said flame is present;

said common series circuit having sufficiently low inductance reactance to permit said capacitive means to discharge through said voltage-breakdown means, when said voltage-breakdown means is in said high-conduction state, until said voltage applied to said discharge-electrode means falls below said extinction voltage and said capacitive means recharges, whereby said voltage-breakdown means alternates between said high-conduction state and said low-conduction state when said flame is present but is in its low-conduction state whenever said flame is absent.

2. The electrical circuit of claim 1, in which said voltage-breakdown means comprises gas-discharge means.

3. The electrical circuit of claim 2, in which said capacitive means, said flame electrodes and said source of alternating voltage are directly connected to each other in said common series circuit and said discharge-electrode means are connected directly to said flame electrodes.

4. The electrical circuit of claim 2, comprising a resistive circuit element connected directly in parallel with said gas-discharge means.

5. The electrical circuit of claim 1, comprising means for sensing changes in the conduction state of said voltage-breakdown means.

6. The circuit of claim 5, in which said voltage-breakdown means comprises gas-discharge means and in which said sensing means comprises means in series with said gas-discharge means and responsive to current passing through said gas-discharge means between said discharge electrodes means.

7. The circuit of claim 6, in which said means in series with said gas-discharge means comprises the gate-to-cathode path of a semiconductor controlled rectifier, said electrical circuit comprising electromechanical means in the anode-cathode circuit of said semiconductor controlled rectifier actuatable in response to current in said anode-cathode circuit.

8. The circuit of claim 5, in which said voltage-breakdown means comprises gas-discharge means and in which said sensing means comprises radiation-sensitive means responsive to radiations produced by said gas-discharge means when said gas-discharge means is rendered highly conductive.

9. The circuit of claim 5, in which said voltage-breakdown means comprises a two-electrode glow lamp.

10. The circuit of claim 5, in which said voltage-breakdown means comprises a plurality of two-electrode glow lamps connected in series with each other.

11. An electrical circuit, comprising:

rectifying means of variable rectifying characteristics having a first pair of electrodes, the rectifying characteristic of said rectifying means being determined by its relative conductances for voltages of opposite polarities applied across it;

a source of an alternating voltage of predetermined maximum peak-to-peak amplitude;

capactive means connected in common series circuit with said source and said first pair of electrodes;

voltage-breakdown means having a pair of discharge-electrode means connecting said voltage-breakdown means in parallel with said first pair of electrodes, said voltage-breakdown means being characterized by a firing voltage which, when applied between discharge-electrode means while said voltage-breakdown means is in its low-conduction state will change said voltage-breakdown means to its high-conduction state and also characterized by an extinction voltage which when applied between said discharge-electrode means while said voltage-breakdown means is in its high-conduction state will change said voltage-breakdown means to its low-conduction state; and said common series circuit being responsive to said alternating voltage, when said rectifying characteristic of said first rectifying means is sufficient, to charge said capacitive means with a direct-voltage component of a given sign in response to one polarity of said alternating voltage and to add to said direct-voltage component a varying component of the same sign as said given sign during the occurrence of the opposite polarity of said alternating voltage, whereby the total voltage applied to said discharge-electrode means during said occurrence of said opposite polarity rises to a value greater than that of either polarity of said alternating voltage alone and greater than said firing voltage of said voltage-breakdown means, said common series circuit being responsive to said alternating voltage in the absence of said sufficient rectifying characteristic to generate a voltage for application to said discharge-electrode means which is no greater than the peak value of either polarity of said alternating voltage;

said firing voltage being greater than the zero-to-peak value of either polarity of said alternating voltage but less than the peak-to-peak value thereof, whereby said voltage-breakdown means is changed to its high-conduction state only when said sufficient rectifying characteristic exists;

said series circuit having sufficiently low inductive reactance to permit said capacitive means to discharge through said voltage-breakdown means when said voltage-breakdown means is in said high-conduction state, until the voltage applied to said discharge-electrode means falls below said extinction voltage and said capacitive means recharges, whereby said voltage-breakdown means alternates between said high-conduction state and said low-conduction state when said sufficient rectifying characteristic is present but is in its low-conduction state whenever said sufficient rectifying characteristic is absent.

12. The circuit of claim 11, in which said voltage-breakdown means comprises gas-discharge means.

13. The circuit of claim 12, in which said rectifying means comprises a flame diode, and in which said electrical circuit comprises a controlledly-variable resistance element in parallel with said gas-discharge means and a rectifying device connected between one terminal of the parallel combination of said resistive element and said gas-discharge means and the interconnection of said capacitive means and one of said first electrodes.

14. The circuit of claim 12, in which said rectifying means comprises a rectifying device and a condition-sensitive resistive element in series with each other, said condition-sensitive resistive element being subject to variation in value in response to changes in environmental conditions, and in which said electric circuit comprises a controlledly-variable resistance element in parallel with said gas-discharge means and another rectifying device connected between one terminal of the parallel combination of said other resistive element and said gas-discharge means and the interconnection of said capacitive means and one of said first electrodes.

15. The circuit of claim 12, in which said rectifying means comprises a rectifying device and a resistive element in series with each other, said resistive element being subject to variation in value in response to changes in environmental conditions.

16. The circuit of claim 12, in which said rectifying means comprises a rectifying device and a photo-responsive device in series with each other.

17. The circuit of claim 12, in which said rectifying means comprises photo-responsive means and means for applying radiations to said photo-responsive means in a greater intensity during one polarity of said alternating voltage than during the opposite polarity thereof.

18. The circuit of claim 17, in which said rectifying means comprises means for varying the illumination of said photo-responsive device in synchronism with said alternating voltage.

19. An electrical time-delay circuit, comprising:

switch means having first and second positions;

capacitive means, a source of alternating voltage of predetermined maximum peak-to-peak amplitude and rectifying means, connected in first common series circuit with each other when said switch means is in said first position thereof, said first common series circuit being effectively opened when said switch means is in said second position thereof;

voltage-breakdown means having a pair of discharge-electrode means connecting said voltage-breakdown means in second common series circuit with said source of alternating voltage and said capacitive means when said switch means is in said second position thereof, said second common series circuit being effectively opened when said switch means is in said first position thereof, said voltage-breakdown means being characterized by a firing voltage which, when applied between said discharge-electrode means while said voltage-breakdown means is in its low-conduction state will change said voltage-breakdown means to its high-conduction state, and also characterized by an extinction voltage which when applied between said discharge-electrode means while said voltage-breakdown means is in its high-conduction state will change said voltage-breakdown means to its low-conduction state; and means for sensing the occurrence of said high-conduction state of said voltage-breakdown means;

said first common series circuit being responsive to said alternating voltage when said switch means is in said first position to charge said capacitive means with a direct-voltage component of a given sign in response to one polarity of said alternating voltage and to add to said direct-voltage component a varying component of the same sign as said given sign during the occurrence of the opposite polarity of said alternating voltage, whereby the total voltage applied to said discharge-electrode means when said switch means is operated from said first position to said second position thereof rises to a value greater than that of either polarity of said alternating voltage alone and greater than said firing voltage of said voltage-breakdown means;

said firing voltage being greater than the zero-to-peak value of either polarity of said alternating voltage but less than the peak-to-peak value thereof, whereby said voltage-breakdown means is changed to its high-conduction state only when said first common series circuit has been operative to produce said charging of said capacitive means and said switch means has been changed from said first position to said second position thereof;

said first common series circuit having sufficiently low inductive reactance to permit said capacitive means to discharge through said voltage-breakdown means when said switch means is in said second position and said voltage-breakdown means is in said high-conduction state until the voltage applied to said discharge-electrode means falls below said extinction voltage, said voltage-breakdown means resumes its low-conduction state, and the voltage applied to said discharge-electrode means rises again above said firing voltage, whereby said voltage-breakdown means alternates between said high-conduction state and said low-conduction state for a predetermined time after said switch means is changed from said first position to said second position thereof until said capacitive means is sufficiently discharged to prevent any further firing of said gas-discharge means.

20. The circuit of claim 19, in which said voltage-breakdown means comprises gas-discharge means.

21. The circuit of claim 20, in which said capacitive means comprises a relatively-larger valued capacitor and the series combination of a relatively-smaller valued capacitor and a resistive element in parallel with said larger-valued capacitor, said gas-discharge means having one input terminal thereof connected to the interconnection of said smaller-valued capacitor and said resistive element.

22. The circuit of claim 21, comprising flame-sensing electrodes connected in parallel with said gas-discharge means.

23. The circuit of claim 22, comprising a controlled-rectifier having its gate electrode connected to said gas-discharge means.

References Cited

UNITED STATES PATENTS

| | | | |
|---|---|---|---|
| 2,006,737 | 7/1935 | Gessford | 328—72 |
| 2,575,001 | 11/1951 | Bird | 315—207 |
| 2,579,884 | 12/1951 | Thomson et al. | 250—206 |
| 2,624,398 | 1/1953 | Thomson | 250—206 |
| 3,041,457 | 6/1962 | Wall | 250—200 |
| 3,062,961 | 11/1962 | Kalns et al. | 250—206 |
| 3,202,976 | 8/1965 | Rowell | 340—228 |
| 3,238,423 | 3/1966 | Giuffrida | 340—228 |
| 2,556,961 | 6/1951 | Feigel | 328—6 X |
| 2,619,595 | 11/1952 | Russell | 328—6 |
| 2,964,686 | 12/1960 | Maddox | 328—6 X |
| 2,352,240 | 6/1944 | Wolfner | 317—149 X |
| 2,481,667 | 9/1949 | Holden | 317—149 X |

THOMAS B. HABECKER, *Acting Primary Examiner.*

NEIL C. READ, *Examiner.*

D. L. TRAFTON, *Assistant Examiner.*